US005509174A

United States Patent [19]

Worrell

[11] Patent Number: 5,509,174

[45] Date of Patent: Apr. 23, 1996

[54] APPLIANCE KNOB AND BEZEL ASSEMBLY

[75] Inventor: James L. Worrell, DeKalb, Ill.

[73] Assignee: K I Industries, Inc., Berkeley, Ill.

[21] Appl. No.: 349,911

[22] Filed: Dec. 6, 1994

[51] Int. Cl.[6] ................................ A47J 45/06; E05B 1/00

[52] U.S. Cl. ............................ 16/121; 403/289; 403/290; 292/347

[58] Field of Search ................................ 16/121; 74/553; 403/289, 290, 329; 292/347

[56] References Cited

U.S. PATENT DOCUMENTS

| | | | |
|---|---|---|---|
| 3,561,287 | 2/1971 | Lawrence, Jr. | 16/121 |
| 4,213,416 | 7/1980 | Klinger | 116/309 |
| 5,253,948 | 10/1993 | Butler | 403/289 |
| 5,345,838 | 9/1994 | Howie, Jr. | 16/121 |

*Primary Examiner*—M. Rachuba
*Assistant Examiner*—Adesh Bhargava
*Attorney, Agent, or Firm*—Dressler, Goldsmith, Shore & Milnamow, Ltd.

[57] ABSTRACT

A knob and bezel assembly for an appliance having a wall with an aperture and having a control with a shaft movable over a limited range of axial movement, rotatable about the axis when moved inwardly, biased outwardly, and projecting outwardly through the aperture. A knob has a handle and a hub, which is adapted to be axially fitted over the shaft so as to be axially movable with the shaft, and which has a keying formation adapted to coact with a keying formation of the shaft so as to be conjointly rotatable therewith. A bezel has a skirt and a hub, which fits slidably over the hub of the knob so that the skirt is disposed between the knob and the appliance wall. Ribs formed integrally on the hub of the knob are fitted slidably into grooves formed in the hub of the bezel to enable conjoint rotation of the knob and the bezel. Two retaining fingers are formed integrally on and extend from the ribs and have outwardly hooked tips hooked outwardly over an inner end of the hub of the bezel. Three biasing fingers formed integrally on the bezel have arcuate portions spaced regularly around the hub of the bezel and axial portions engaged with the knob and are arranged to be resiliently flexed so as to bias the bezel so that the skirt engages the appliance wall.

10 Claims, 1 Drawing Sheet

FIG. 1
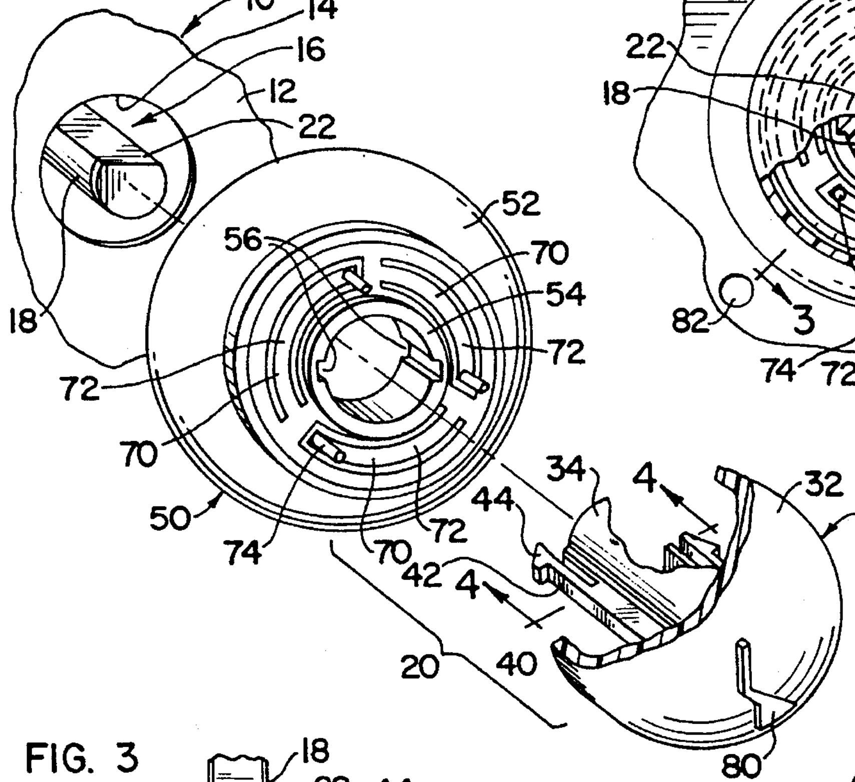
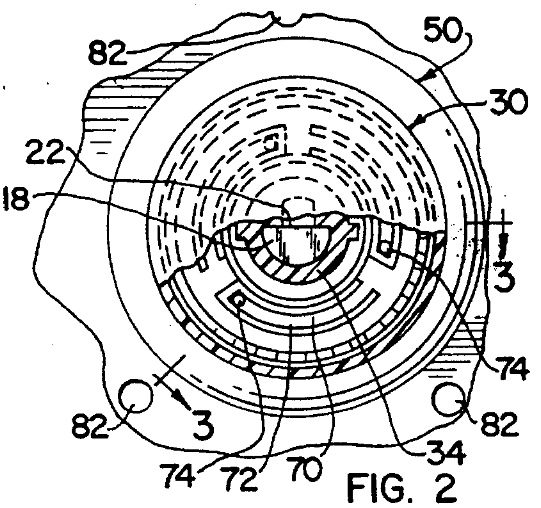
FIG. 2
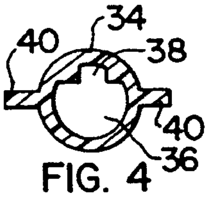
FIG. 4
FIG. 3
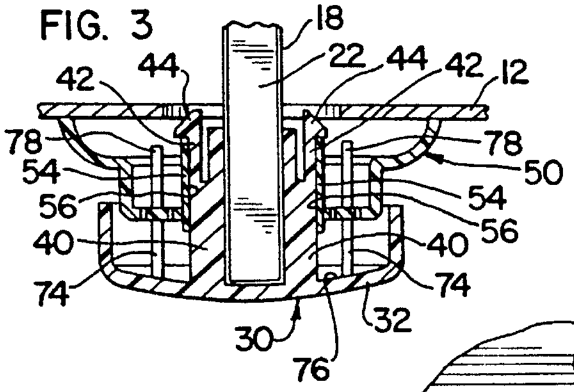
FIG. 5
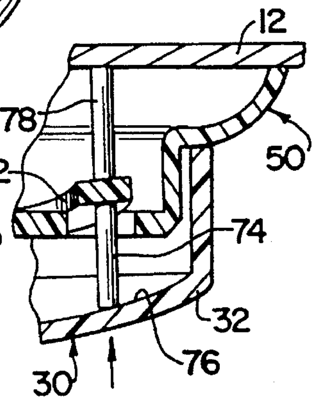
FIG. 6
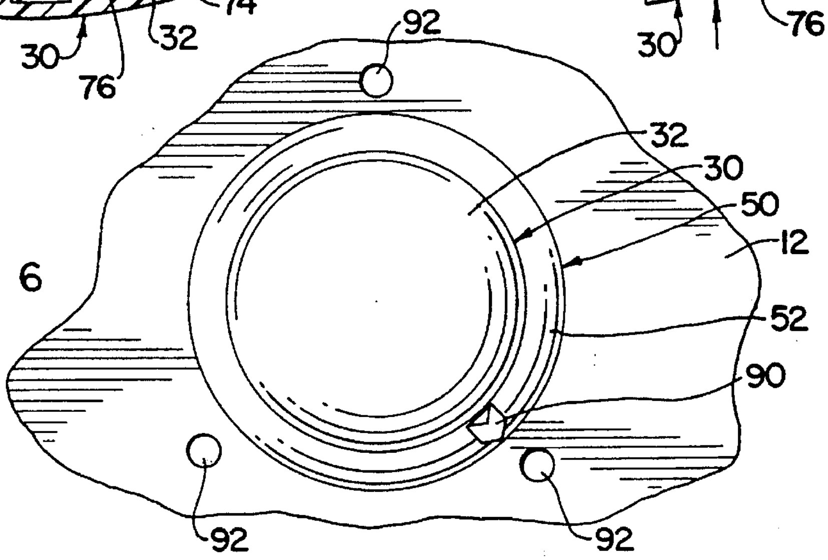

APPLIANCE KNOB AND BEZEL ASSEMBLY

TECHNICAL FIELD OF THE INVENTION

This invention pertains to a knob and bezel assembly for an appliance, such as a gas oven, gas range, or electric range, which has a control equipped with a so-called "push to turn" shaft. The knob and bezel assembly has integrally formed means for biasing the bezel so that a skirt of the bezel engages a wall of the appliance.

BACKGROUND OF THE INVENTION

Commonly, gas ovens, gas ranges, and other gas appliances employ gas valves and other controls equipped with so-called "push to turn" shafts aligned axially with associated apertures in the appliance walls. Commonly, moreover, electric ranges and other electric appliances employ controls equipped with such "push to turn" shafts.

Typically, a "push to turn" shaft is movable inwardly and outwardly over a limited range of axial movement, rotatable about the axis at least when moved inwardly to an inward limit of the limited range of axial movement, and biased outwardly to an outward limit of the limited range of axial movement.

Generally, a knob is provided for pushing and turning a "push to turn" shaft. Typically, therefore, a "push to turn" shaft has a keying formation adapted to coact with a keying formation on a knob so as to enable conjoint rotation of the knob and the shaft at least when the shaft is moved inwardly to an inward limit of the limited range of axial movement.

A separate bezel may be also provided for concealing the associated aperture in the appliance wall, along with one or more separate springs for biasing the bezel inwardly from the knob and against the appliance wall as the knob is moved inwardly and outwardly with the "push to turn" shaft.

As it is cumbersome to preassemble a knob, a separate bezel, and one or more springs, a need has been recognized for a knob and bezel assembly that can be easily preassembled, that does not require one or more separate springs, and that is moldable in two pieces from a suitable polymer.

SUMMARY OF THE INVENTION

Addressing the need noted above, this invention provides a knob and bezel assembly for an appliance having a wall provided with an aperture and having a control equipped with a "push to turn" shaft, as described above. Broadly, the knob and bezel assembly comprises a knob, a bezel, and means formed integrally on the knob or on the bezel for biasing the bezel, as described below. The knob and bezel assembly is moldable in two pieces from a suitable polymer.

Herein, references to an appliance are to be broadly understood to refer to gas ovens, gas ranges, electric ranges and other similar and dissimilar appliances, whether used in kitchens or elsewhere.

Specifically, the knob has a handle and a hub, which is integral with the handle. Moreover, the bezel has a skirt and a hub, which is integral with the skirt.

The hub of the knob is adapted to be axially fitted over the shaft with a frictional fit so as to be axially movable with the shaft. Also, the hub of the knob has a keying formation, which is adapted to coact with the keying formation of the shaft so as to enable conjoint rotation of the knob and the shaft. The hub of the bezel fits slidably over the hub of the knob so that the bezel is disposed between the knob and the appliance wall when the hub of the knob is fitted axially over the shaft.

The bezel is biased, by the biasing means, so that the skirt engages the appliance wall when the hub of the knob is fitted axially over the shaft. Preferably, the biasing means comprises one or more biasing fingers formed integrally on the bezel, spaced regularly around the hub of the bezel, engaged with the knob, and arranged to be resiliently flexed when the knob is fitted axially over the shaft and is moved inwardly so as to bias the bezel so that the skirt engages the appliance wall when the hub of the knob is fitted axially over the shaft. Preferably, moreover, each biasing finger has a generally arcuate portion extending partly around the hub of the bezel and a generally axial portion engaged with the knob.

Moreover, the knob and bezel assembly may comprise means formed integrally on the knob or on the bezel for enabling conjoint rotation of the knob and the bezel. Preferably, the enabling means comprises two diametrically opposed, axially extending ribs formed integrally on the hub of the knob, each rib being fitted into an axially extending groove formed in the hub of the bezel.

Furthermore, the knob and bezel assembly may comprise means formed integrally on the knob or on the bezel for retaining the bezel so as to prevent the knob from being removed from the shaft without removing the bezel when the hub of the knob is fitted axially over the shaft. Preferably, the retaining means comprises two retaining fingers, each extending axially from one of the axially extending ribs and having an outwardly hooked tip, which is hooked over an inner end of the hub of the bezel so as to prevent the knob from being removed from the shaft without removing the bezel when the hub of the knob is fitted axially over the shaft.

These and other objects, features, and advantages of this invention are evident from the following description of a preferred embodiment of this invention with reference to the accompanying drawings.

BRIEF DESCRIPTION OF THE DRAWINGS

FIG. 1 is a fragmentary, perspective, exploded view of a "push to turn" shaft aligned with an aperture in an appliance wall, along with a knob and bezel assembly constituting a preferred embodiment of this invention.

FIG. 2 is a fragmentary, axial view of the knob and bezel assembly mounted on the shaft, against the appliance wall.

FIG. 3 is a sectional view taken along line 3—3 of FIG. 2, in a direction indicated by arrows. The knob and the shaft are shown at an outward limit of a limited range of axial movement.

FIG. 4 is a sectional view taken along line 4—4 of FIG. 1, in a direction indicated by arrows.

FIG. 5 is a fragmentary, sectional view, in which the knob and the shaft are shown an inner limit of the limited range of axial movement.

FIG. 6 is a fragmentary, axial view of a modification of the knob and bezel assembly mounted on the shaft, against the appliance wall.

DETAILED DESCRIPTION OF THE PREFERRED EMBODIMENT

As shown in FIG. 1, an appliance 10 shown fragmentarily, such as a gas oven or a gas range, has a metal or glass wall 12 with a circular aperture 14 and a control 16, such as a gas valve, with a "push to turn" shaft 18. Moreover, a knob and bezel assembly 20 constituting a preferred embodiment of this invention is provided for pushing and turning the shaft 18. The knob and bezel assembly 20 is molded in two pieces, which are described below, and does not require one or more separate springs.

The shaft 18, which defines an axis, is movable inwardly and outwardly over a limited range of axial movement, rotatable about the axis at least when moved inwardly to an inward limit of the limited range of axial movement, and biased outwardly to an outward limit of the limited range of axial movement. The shaft 18 is aligned axially with the aperture 14 and may project outwardly through the aperture 14. The shaft 18 has a generally D-shaped (in cross-section) end portion 22, which defines a keying formation for a purpose described below. It should be here understood that the appliance 10, the control 16, the shaft 18, and the means for biasing the shaft are known elements, details of which are outside the scope of this invention.

The knob and bezel assembly 20 comprises a knob 30, which is molded from a suitable polymer, nylon 6/6 being preferred. The knob 30 has a handle 32, which may be dome-like, as shown, and a hub 34, which is integral with the handle 32 and which defines an axis. The hub 34 has a generally D-shaped (in cross-section) cavity 36, which adapts the hub 34 to be axially fitted over the shaft 18 with a frictional fit so as to be axially movable with the shaft 18. As shown, the generally D-shaped cavity 36 includes a channel 38, which eliminates excess material when the knob 30 is molded. The channel 38 may be omitted in some applications. Whether or not the channel 38 is included, the generally D-shaped cavity 36 defines a keying formation that is adapted to coact with the keying formation defined by the generally D-shaped end portion 22 of the shaft 18 so as to enable conjoint rotation of the knob 30 and the shaft 18 at least when the shaft 18 is moved inwardly to an inward limit of the limited range of axial movement.

This invention is not limited to use with a shaft having a generally D-shaped cross-section but is useful with mating shafts of other types. Thus, alternatively and equivalently, the shaft 18 and the hub 34 of the knob 30 may have splines (not shown) or other keying formations coacting so as to enable conjoint rotation of the knob 30 and the shaft 18 at least when the shaft 18 is moved inwardly to an inward limit of the limited range of axial movement.

For a purpose described below, two diametrically opposed, axially extending ribs 40 are formed integrally on the hub 34 along with two retaining fingers 42. Each retaining finger is formed integrally on and extending axially from one of the ribs 40. Each retaining finger has an outwardly hooked tip 44.

The knob and bezel assembly 20 comprises a bezel 50, which is molded from a suitable polymer, nylon 6/6 being preferred. The bezel 50 has a skirt 52 and a hub 54, which is integral with the skirt 52 and which has two diametrically opposed, axially extending grooves 56. The hub 54 fits slidably over the hub 34 of the knob 30 so that the bezel 50 is disposed between the knob 30 and the appliance wall 12 when the hub 34 of the knob 30 is fitted axially over the shaft 18, so that each of the ribs 40 of the hub 34 of the knob 30 is fitted slidably into one of the grooves 56 of the hub 54 of the bezel 50, and so that the outwardly hooked tips 44 are hooked over the inner end 58 of the hub 54 so as to prevent the knob 30 from being removed from the shaft 18 without removing the bezel 50 when the hub 34 of the knob 30 is fitted axially over the shaft 18.

Thus, when the knob 30 is pushed inwardly, the knob 30 and the shaft 18 are moved inwardly. Since the shaft 18 is biased outwardly, the knob 30 is moved outwardly when the shaft 18 is moved outwardly, as biased. Moreover, as shown in FIG. 3, the circular aperture 14 in the appliance wall 12 has sufficient diameter to accommodate the outwardly hooked tips 44 without interference when the knob 30 is moved inwardly or outwardly with the shaft 18.

Three biasing fingers 70 are formed integrally on the bezel 50 so as to be regularly spaced around the hub 54. Each biasing finger 70 is cut away from the bezel 50 on three sides, as shown in FIG. 1, so as to have a generally arcuate portion 72 extending partly around the hub 54, a generally axial portion 74 extending toward and engaged with an interior surface 76 of the handle 32 of the knob 30, and a generally axial portion 78 extending oppositely. These biasing fingers 70 are arranged to be resiliently flexed when the knob is fitted axially over the shaft 18 and is moved inwardly so as to bias the bezel 50, in a manner shown in FIG. 5, so that the skirt 52 engages the appliance wall 12 when the hub 34 of the knob 30 is fitted axially over the shaft 18. The generally axial portions 78 are unimportant artifacts of the molding process and may be removed. The biasing fingers 70 can be inwardly flexed to an inward limit that is reached when the generally axial portions 78 (if not removed) engage the appliance wall 12. In any event, the biasing fingers 70 should be inwardly flexible for an axial distance that is greater than the axial distance that the "push to turn" shaft 18 must be inwardly pushed to become rotatable.

As shown in FIGS. 1 and 2, the knob 30 is molded so that the handle 32 has an exterior indicator 80, which is useful for aligning the knob and bezel assembly 20 rotatably with indicators 82 provided on the appliance wall 12. A modification is shown in FIG. 6, in which the bezel 50 is molded so that the skirt 52 has an exterior indicator 90, which is useful for aligning the knob and bezel assembly 20 rotatably with indicators 92 provided on the appliance wall 12. There is no need, however, for the knob 32 or the bezel 50 to have such an exterior indicator.

Various other modifications may be made in the preferred embodiment described above without departing from the scope and spirit of this invention.

I claim:

1. A knob and bezel assembly for an appliance having a wall provided with an aperture and having a control equipped with a shaft, which defines an axis, which is movable inwardly and outwardly over a limited range of axial movement, which is rotatable about the axis at least when moved inwardly to an inward limit of the limited range of axial movement, which is biased outwardly to an outward limit of the limited range of axial movement, which is aligned axially with the aperture in the appliance wall, and which has a keying formation adapted to coact with a keying formation on a knob so as to enable conjoint rotation of the knob and the shaft at least when the shaft is moved inwardly to an inward limit of the limited range of axial movement, the knob and bezel assembly comprising (a) a knob having a handle and a hub, which is integral with the handle, which is adapted to be axially fitted over the shaft with a frictional fit so as to be axially movable with the shaft, and which has a keying formation adapted to coact with the keying formation of the shaft so as to enable conjoint rotation of the knob and the shaft, (b) a bezel having a skirt and a hub, which is integral with the skirt, which fits slidably over the hub of the knob so that the skirt is disposed between the knob and the appliance wall when the hub of the knob is fitted axially over the shaft, (c) means formed integrally on the knob or on the bezel for biasing the bezel so that the skirt engages the appliance wall when the hub of the knob is fitted axially over the shaft, and (d) means formed integrally on the knob or on the bezel for enabling conjoint rotation of the knob and the bezel, wherein the means for enabling conjoint rotation of the knob and the bezel comprises an axially extending rib formed integrally on the hub of the knob and fitted slidably into an axially extending groove formed in the hub of the bezel.

2. The knob and bezel assembly of claim 1 further comprising means for retaining the bezel so as to prevent the knob from being removed from the shaft without removing the bezel when the hub of the knob is fitted axially over the shaft, wherein the means for retaining the bezel includes a retaining finger formed integrally on and extending axially from the axially extending rib and having an outwardly hooked tip, which is hooked over an inner end of the hub of the bezel.

3. The knob and bezel assembly of claim 1 further comprising means for retaining the bezel so as to prevent the knob from being removed from the shaft without removing the bezel when the hub of the knob is fitted axially over the shaft, wherein the means for retaining the bezel includes two retaining fingers, each being formed integrally on and extending axially from one of the axially extending ribs and having an outwardly hooked tip, which is hooked over an inner end of the hub of the bezel.

4. A knob and bezel assembly for an appliance having a wall provided with an aperture and having a control equipped with a shaft, which defines an axis, which is movable inwardly and outwardly over a limited range of axial movement, which is rotatable about the axis at least when moved inwardly to an inward limit of the limited range of axial movement, which is biased outwardly to an outward limit of the limited range of axial movement, which is aligned axially with the aperture in the appliance wall, and which has a keying formation adapted to coact with a keying formation on a knob so as to enable conjoint rotation of the knob and the shaft at least when the shaft is moved inwardly to an inward limit of the limited range of axial movement, the knob and bezel assembly comprising (a) a knob having a handle and a hub, which is integral with the handle, which is adapted to be axially fitted over the shaft with a frictional fit so as to be axially movable with the shaft, and which has a keying formation adapted to coact with the keying formation of the shaft so as to enable conjoint rotation of the knob and the shaft, (b) a bezel having a skin and a hub which is integral with the skirt, which fits slidably over the hub of the knob so that the skirt is disposed between the knob and the appliance wall when the hub of the knob is fitted axially over the shaft, (c) means formed integrally on the knob or on the bezel for biasing the bezel so that the skirt engages the appliance wall when the hub of the knob is fitted axially over the shaft, and (d) means formed integrally on the knob or on the bezel for enabling conjoint rotation of the knob and the bezel, wherein the means for enabling conjoint rotation of the knob and the bezel comprises two diametrically opposed, axially extending ribs formed integrally on the hub of the knob, each rib being fitted slidably into an axially extending groove formed in the hub of the bezel, to enable conjoint rotation of the knob and the bezel.

5. A knob and bezel assembly for an appliance having a wall provided with an aperture and having a control equipped with a shaft, which defines an axis, which is movable inwardly and outwardly over a limited range of axial movement, which is rotatable about the axis at least when moved inwardly to an inward limit of the limited range of axial movement, which is biased outwardly to an outward limit of the limited range of axial movement, which is aligned axially with the aperture in the appliance wall, and which has a keying formation adapted to coact with a keying formation on a knob so as to enable conjoint rotation of the knob and the shaft at least when the shaft is moved inwardly to an inward limit of the limited range of axial movement, the knob and bezel assembly comprising (a) a knob having a handle and a hub, which is integral with the handle, which is adapted to be axially fitted over the shaft with a frictional fit so as to be axially movable with the shaft, and which has a keying formation adapted to coact with the keying formation of the shaft so as to enable conjoint rotation of the knob and the shaft, (b) a bezel having a skirt and a hub, which is integral with the skirt, which fits slidably over the hub of the knob so that the skirt is disposed between the knob and the appliance wall when the hub of the knob is fitted axially over the shaft, and (c) means formed integrally on the knob or on the bezel for biasing the bezel so that the skirt engages the appliance wall when the hub of the knob is fitted axially over the shaft, wherein the means for biasing the bezel comprises a biasing finger formed integrally on the bezel, engaged with the knob, and arranged to be resiliently flexed when the knob is fitted axially over the shaft and is moved inwardly.

6. The knob and bezel assembly of claim 5 wherein the biasing finger has a generally arcuate portion extending partly around the hub of the bezel and a generally axial portion engaged with the knob.

7. A knob and bezel assembly for an appliance having a wall provided with an aperture and having a control equipped with a shaft, which defines an axis, which is movable inwardly and outwardly over a limited range of axial movement, which is rotatable about the axis at least when moved inwardly to an inward limit of the limited range of axial movement, which is biased outwardly to an outward limit of the limited range of axial movement, which is aligned axially with the aperture in the appliance wall, and which has a keying formation adapted to coact with a keying formation on a knob so as to enable conjoint rotation of the knob and the shaft at least when the shaft is moved inwardly to an inward limit of the limited range of axial movement, the knob and bezel assembly comprising (a) a knob having a handle and a hub, which is integral with the handle, which is adapted to be axially fitted over the shaft with a frictional fit so as to be axially movable with the shaft, and which has a keying formation adapted to coact with the keying formation of the shaft so as to enable conjoint rotation of the knob and the shaft, (b) a bezel having a skirt and a hub, which is integral with the skirt, which fits slidably over the hub of the knob so that the skirt is disposed between the knob and the appliance wall when the hub of the knob is fitted axially over the shaft, and (c) means formed integrally on the knob or on the bezel for biasing the bezel so that the skirt engages the appliance wall when the hub of the knob is fitted axially over the shaft, wherein the means for biasing the bezel comprises three biasing fingers formed integrally on the bezel, spaced regularly around the hub of the bezel, engaged with the knob, and arranged to be resiliently flexed when the knob is fitted axially over the shaft and is moved inwardly.

8. The knob and bezel assembly of claim 7 wherein each biasing finger has a generally arcuate portion extending partly around the hub of the bezel and a generally axial portion engaged with the knob.

9. A knob and bezel assembly for an appliance having a wall provided with an aperture and having a control equipped with a shaft, which defines an axis, which is movable inwardly and outwardly over a limited range of axial movement, which is rotatable about the axis at least when moved inwardly to an inward limit of the limited range of axial movement, which is biased outwardly to an outward limit of the limited range of axial movement, which is aligned axially with the aperture in the appliance wall, and which has a keying formation adapted to coact with a keying formation on a knob so as to enable conjoint rotation of the knob and the shaft at least when the shaft is moved inwardly to an inward limit of the limited range of axial movement, the knob and bezel assembly comprising (a) a knob having a handle and a hub, which is integral with the handle, which is adapted to be axially fitted over the shaft with a frictional fit so as to be axially movable with the shaft, and which has a keying formation adapted to coact with the keying formation of the shaft, (b) a bezel having a skirt and a hub, which is integral with the skirt, which fits slidably over the hub of the knob so that the skirt is disposed between the knob and the appliance wall when the hub of the knob is fitted axially over the shaft, (c) two diametrically opposed, axially extending ribs formed integrally on the hub of the knob, each rib being fitted slidably into an axially extending groove formed in the hub of the bezel, to enable conjoint rotation of the knob and the bezel, (d) two retaining fingers, each being formed integrally on and extending axially from one of the axially extending ribs and having an outwardly hooked tip, which is hooked over an inner end of the hub of the bezel so as to prevent the knob from being removed from the shaft without removing the bezel when the hub of the knob is fitted axially over the shaft, and (e) three biasing fingers formed integrally on the bezel, spaced regularly around the hub of the bezel, engaged with the knob, and arranged to be resiliently flexed when the knob is fitted axially over the shaft and is moved inwardly so as to bias the bezel so that the skirt engages the appliance wall when the hub of the knob is fitted axially over the shaft.

10. The knob and bezel assembly of claim 9 wherein each biasing finger has a generally arcuate portion extending partly around the hub of the bezel and a generally axial portion engaged with the knob.

* * * * *